W. J. FREEMAN.
Corn-Planter.
No. 58,243. Patented Sept. 25, 1866.
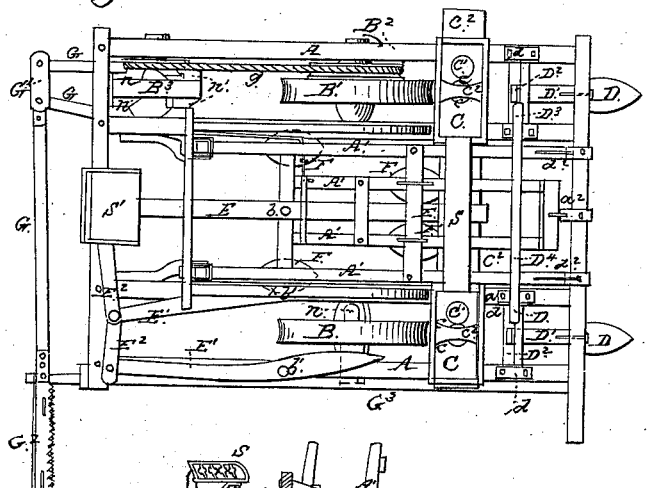
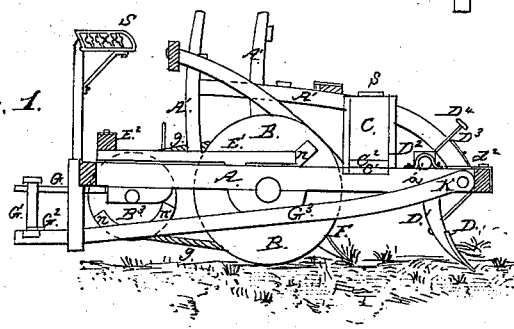
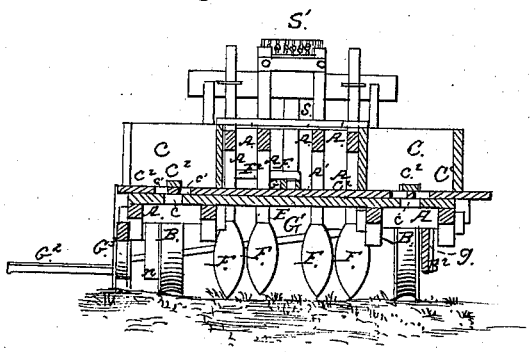
WITNESSES:
S. M. Randolph
A. Wagner
INVENTOR:
W. J. Freeman
By his attorney
M. Randolph

UNITED STATES PATENT OFFICE.

WILLIAM J. FREEMAN, OF SPRING FORK, MISSOURI.

IMPROVEMENT IN COMBINED SEEDER AND CULTIVATOR.

Specification forming part of Letters Patent No. 58,243, dated September 25, 1866.

*To all whom it may concern:*

Be it known that I, WILLIAM J. FREEMAN, of Spring Fork, in the county of Pettis and State of Missouri, have invented a new Combined Seed-Planter and Cultivator; and I do hereby declare that the following is a full and clear description thereof, reference being had to the accompanying drawings, and to the letters of reference marked thereon.

Figure 1 of the accompanying drawings is a side elevation of the improved machine. Fig. 2 is a plan of the same. Fig. 3 is a transverse section on $a\ b$.

The nature of this invention consists in combining and arranging a seed-planter and cultivator upon one frame, so that either may be removed when the other implement is to be used, thereby affording great economy in the construction and maintenance of these necessary utensils of the agriculturalist.

To enable those skilled in the art to make and use my improved machine, I will proceed to describe its construction and operation.

A is a frame to which all other parts of the machine are attached, as hereinafter described, the whole being mounted on the wheels B B', the faces of which should be concave, as shown in Fig. 2, so as to facilitate the covering of the seeds as they drop from the planters which immediately precede them.

There are two hoppers, C C, on the forward part of the frame A, into which the seed to be planted is placed. The plows D D are located immediately in advance of the hoppers, and are intended to open furrows for the reception of the seed deposited therefrom. The plow-posts D' are fastened into the rock-shafts $D^2$, which have their bearings on the frame A at $a$. A lever, $D^3$, is framed into the upper side of each of the rock-shafts $D^2$, and a cross-bar, $D^4$, connects the upper ends of these levers together, so that the driver seated upon the seat S (which will be used when the machine is to be employed as a seed-planter) can, with his hand, readily grasp the cross-bar and bring it toward him, thereby raising the plows D D out of the ground when it is necessary to turn the machine around.

The hoppers C C are erected upon the outer ends of the transverse beam C', as clearly shown in Fig. 3. The slide $C^2$ is placed on top of the beam C', and is given a reciprocating longitudinal motion, by means hereinafter described. There is a small mortise, $c$, made through the beam C', directly beneath the vertical axis of the hopper, and there are two mortises, $c'$, made through each end of the slide $C^2$, and so arranged in it that when the slide is as far to one side as the operating machinery will allow it to go, two of the mortises, $c'$, will be filled with seed, which will be moved along with the slide until it can fall out through the mortise $c$. Thus at every revolution of the machine a certain and invariable quantity of seed will fall out into the furrow. The slide C receives its motion from the lever E, one end of which is attached to it, and the other end to the vibrating levers E', while it is pivoted near its center to the frame A at $b$. The vibrating levers E are pivoted to the frame A at $b'$, and the back ends of them are connected together by the links $E^2$, so that their motions will be in harmony with each other.

There are two lugs, $n$, fastened to the opposite sides of the wheel B, which at every revolution of the wheels strikes the levers E', and gives to them a reciprocating motion, which is transmitted to the slide $C^2$ through the medium of the lever E.

The cultivator-plows F are attached to the frames A', which are connected with the frame A by means of the links $a^2$ in such a manner as to be easily removed when not needed.

Although the invention hereinbefore described is the special subject of this application, some of the parts—as, for instance, the frame A and the wheels B B'—are intended to be used in connection with a harvester which will be substituted for the other machines, as follows: The seed hoppers and plows, with the frames A', will be removed from the machine, and the curved beam $G^3$ will instead be bolted to the side of the frame A at $h$. The harvester-cutters $G^2$ will be operated by means of the connecting-rods G', which are actuated by means of the vibrating levers G, the levers being driven by striking alternately lugs $n'$ on the opposite sides of the wheel $B^3$, the operation being similar to that already described for the levers E'. The wheel $B^3$ is driven by means of a belt, $g$, which is to be actuated from the wheel $B^2$, attached to the wheel B'.

When this machine is employed as a cultivator the driver will occupy the seat S', and the planter portions of it will be removed. When it is to be used as a seed-planter the cultivator portions will be removed, so that by these combined arrangements this machine can be converted either into a seed-planter or cultivator, at pleasure.

Having described my invention, what I claim is—

1. The combination of the hopper C and beam C', with the slide C², and the levers E and E', and lugs $n$ on the wheel B, when constructed, as and for the purpose set forth.

2. The frame A, and the wheels B B', combined and arranged with cultivator hereinbefore described, substantially in the manner set forth.

3. The frame A, and the wheels B B', combined and arranged with the seed-planter hereinbefore described, substantially in the manner set forth.

4. The posts D', and the rock-shaft D² of the plows D, in combination with the frame A, substantially as described.

WILLIAM J. $\times$ FREEMAN.
his
mark.

Witnesses:
S. M. RANDOLPH,
GEO. BELLOS.